United States Patent Office 2,726,208
Patented Dec. 6, 1955

---

2,726,208

NON-CORROSIVE LUBRICANT COMPOSITION

Robert E. Karll, Hammond, and Albert R. Sabol, Munster, Ind., assignors to Standard Oil Company, Chicago, Ill., a corporation of Indiana No Drawing. Application October 15, 1954,
Serial No. 462,610

16 Claims. (Cl. 252—32.7)

---

This invention relates to improved lubricant compositions and more particularly is directed to lubricant compositions having improved corrosion inhibiting properties.

Within recent years it has become common practice to impart improved properties to lubricants through the use of various types of additives or addition agents. Lubricating oils employed in internal combustion engines such as automotive and diesel engines require the use of one or more addition agents to improve their serviceability under certain adverse operating conditions. Among the more important additives employed are the type which function to prevent the formulation and accumulation of sludge and varnish-like coatings on pistons and cylinder walls of the engine. Such additives which have the property of maintaining clean engines are referred to as "detergent-type" addition agents.

Corrosion inhibitors also play an important part in the formulation of efficient lubricants. Such corrosion inhibitors should effectively inhibit the corrosion of metal alloys of the type used in engine bearings and other engine parts. In recent years the increased use of silver and similar metals in internal combustion engines has created new problems in the use of sulfur-containing additives in lubricants because of the tendency of such sulfur compounds to corrode silver, silver alloys and similar metals.

It is an object of the present invention to provide a lubricant composition which possesses detergency and corrosion inhibiting characteristics. It is another object of the invention to provide a lubricant composition which is non-corrosive. A further object of the invention is to provide a composition which will inhibit the corrosion of silver and similar metals by sulfur and/or organic sulfur-containing compounds. Still another object of the invention is to provide a method of inhibiting the corrosion of engine parts in contact with lubricant compositions which contain sulfur and/or organic sulfur-containing compounds which are normally corrosive to metals. Other objects and advantages of the present invention will become apparent from the ensuing description thereof.

In accordance with the present invention the foregoing objects can be attained by incorporating in lubricant compositions from about 0.1% to about 10% of an oil-soluble mixed salt complex obtained by reacting an oil-soluble metal salt of a phosphorus sulfide-hydrocarbon reaction product with a water-soluble polyvalent metal salt of a low molecular weight aliphatic saturated carboxylic acid of 1 to 4 carbon atoms.

The oil-soluble metal salt of the phosphorus sulfide-hydrocarbon reaction product is preferably a metal salt of the type described in U. S. 2,316,082 issued to C. M. Loane et al., April 6, 1943. As taught in this patent, the preferred hydrocarbon constituent of the reaction is a mono-olefin hydrocarbon polymer resulting from the polymerization of low molecular weight mono-olefin hydrocarbons, such as propylene, butenes, amylenes or copolymers thereof. Such polymers may be obtained by the polymerization of mono-olefins of less than 6 carbon atoms in the presence of a catalyst, such as sulfuric acid, phosphoric acid, boron fluoride, aluminum chloride, or other similar halide catalysts of the Friedel-Crafts type.

The polymers employed are preferably mono-olefin polymers or mixtures of mono-olefin polymers and iso-mono-olefin polymers having molecular weights ranging from about 150 to 50,000 or more and preferably from about 500 to about 10,000. Such polymers can be obtained, for example, by the polymerization in the liquid phase of a hydrocarbon mixture containing mono- and iso-mono-olefins, such as butylene and isobutylene at a temperature of from about −80° F. to about 100° F. in the presence of a metal halide catalyst of the Friedel-Crafts type, such as for example, boron fluoride, aluminum chloride, and the like. In the preparation of these polymers, a hydrocarbon mixture containing isobutylene, butylenes and butanes recovered from petroleum gases, especially those gases produced in the cracking of petroleum oils in the manufacture of gasoline can be used.

Another suitable polymer is that obtained by polymerizing in the liquid phase a hydrocarbon mixture comprising substantially $C_3$ hydrocarbons in the presence of an aluminum chloride-complex catalyst. The catalyst is preferably prepared by heating aluminum chloride with iso-octane. The hydrocarbon mixture is introduced into the bottom of the reactor and passed upward through the catalyst layer, while a temperature of from about 50° F. to about 110° F. is maintained in the reactor. The propane and other saturated gases pass through the catalyst, while the propylene is polymerized under these conditions. The propylene polymer can be fractionated to any desired molecular weight, preferably from about 500 to about 1000 or higher.

Other suitable polymers are those obtained by polymerizing a hydrocarbon mixture containing about 10% to about 25% isobutylene at a temperature of from about 0° F. to about 100° F., and preferably 0° F. to about 32° F., in the presence of boron fluoride. After the polymerization of the isobutylene together with a relatively minor amount of the normal olefins present the reaction mass is neutralized, washed free of acidic substances, and the unreacted hydrocarbons subsequently separated from the polymers by distillation. The polymer mixture so obtained, depending upon the temperature of reaction, varies in consistency from a light liquid to a viscous oily material and contains polymers having molecular weights ranging from about 100 to about 2,000 or higher. The polymers so obtained may be used as such or the polymer may be fractionated under reduced pressure into fractions of increasing molecular weight and suitable fractions reacted with the phosphorus sulfide to obtain the desired reaction products. The bottoms resulting from the fractionation of the polymer which have Saybolt Universal viscosities at 210° F. ranging from about 50 seconds to about 10,000 seconds are well suited for this purpose.

Essentially paraffinic hydrocarbons, such as bright stock residuums, lubricating oil distillates, petrolatums, or paraffin waxes may be used. There can also be employed the condensation products of any of the foregoing hydrocarbons, usually through first halogenating the hydrocarbons and reacting with aromatic hydrocarbons in the presence of anhydrous inorganic halides, such as aluminum chloride, zinc chloride, boron fluoride, and the like.

Examples of other high molecular weight olefinic hydrocarbons which can be employed are cetene ($C_{16}$), cerotene ($C_{26}$), melene ($C_{30}$) and mixed high molecular weight alkenes obtained by cracking petroleum oils.

Other preferred olefins suitable for the preparation of the phosphorus sulfide reaction products are olefins having at least 20 carbon atoms in the molecule of which from about 13 carbon atoms to about 18 carbon atoms and preferably at least 15 carbon atoms are in a long chain. Such olefins can be obtained by the dehydrogenation of alkyl halides, preferably long chain alkyl halides, particularly halogenated paraffin waxes.

As a starting material there can be used the polymer or synthetic lubricating oil obtained by polymerizing unsaturated hydrocarbons resulting from the vapor phase cracking of paraffin waxes in the presence of aluminum chloride which is fully described in U. S. Patents 1,955,260, 1,970,402 and 2,091,398. Still another type of olefin polymer which may be employed is the polymer resulting from the treatment of vapor phase cracked gasoline and/or gasoline fractions with sulfuric acid or solid adsorbents, such as Fuller's earth, whereby unsaturated polymerized hydrocarbons are removed. The reaction products of the phosphorus sulfide and the polymers resulting from the voltolization of hydrocarbons as described, for example, in U. S. Patents 2,197,768 and 2,191,787 are also suitable.

Other hydrocarbons that can be reacted with a phosphorus sulfide are aromatic hydrocarbons, such as for example, benzene, naphthalene, toluene, xylene, diphenyl and the like, or an alkylated aromatic hydrocarbon, such as for example, benzene having an alkyl substituent having at least 4 carbon atoms and preferably at least 8 carbon atoms, such as a long chain paraffin wax.

The phosphorus sulfide-hydrocarbon reaction product can be readily obtained by reacting a phosphorus sulfide, for example, $P_2S_5$ with the hydrocarbon at a temperature of from about 200° F. to about 500° F., and preferably from about 200° F. to about 400° F., using from about 1% to about 50% and preferably from about 5% to about 25% of the phosphorus sulfide in the reaction. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon so that no further purification becomes necessary; however, an excess amount of phosphorus sulfide can be used and separated from the product by filtration or by dilution with a hydrocarbon solvent, such as hexane, filtering and subsequently removing the solvent by suitable means, such as by distillation. If desired, the reaction product can be further treated with steam at an elevated temperature of from about 100° F. to about 600° F.

The phosphorus sulfide-hydrocarbon reaction product normally shows a titratable acidity which is neutralized by treatment with a basic reagent. The phosphorus sulfide-hydrocarbon reaction product, when neutralized with a basic reagent containing a metal constituent, is characterized by the presence or retention of the metal constituent of the basic reagent.

The neutralized phosphorus sulfide-hydrocarbon reaction product can be obtained by treating the acidic reaction product with a suitable basic compound, such as hydroxide, carbonate, oxide or sulfide of an alkaline earth metal or an alkali metal, such as for example, potassium hydroxide, sodium hydroxide, sodium sulfide, calcium oxide, lime, barium hydroxide, barium oxide, etc. Other basic reagents can be used, such as for example, ammonia or an alkyl or aryl-substituted ammonia, such as amines. The neutralization of the phosphorus sulfide-hydrocarbon reaction product is carried out preferably in a non-oxidizing atmosphere by contacting the acidic reaction product either as such or dissolved in a suitable solvent, such as naphtha with a solution of the basic reagent. As an alternative method, the reaction product can be treated with solid alkaline compounds, such as KOH, NaOH, $Na_2CO_3$, CaO, BaO, $Ba(OH)_2$, $Na_2S$ and the like, at an elevated temperature of from about 100° F. to about 600° F. Neutralized reaction products containing a heavy metal constituent, such as for example, tin, titanium, aluminum, chromium, cobalt, zinc, iron and the like can be obtained by reacting a salt of the desired heavy metal with the phosphorus sulfide-hydrocarbon reaction product which has been treated with the phosphorus sulfide-hydrocarbon reaction product, which has been treated with a basic reagent, such as above-described.

Other oil-soluble metal salts of phosphorus sulfide-hydrocarbon reaction products which are also suitable are described in U. S. 2,316,080, 2,316,081 and 2,316,088 issued to C. M. Loane et al. April 6, 1943; U. S. 2,316,085 issued to C. D. Kelso et al. April 6, 1943; U. S. 2,316,087 issued to J. W. Gaynor et al. April 6, 1943; Re. 22,464 issued to C. D. Kelso et al. April 4, 1944; U. S. 2,377,955 issued to L. W. Mixon June 12, 1945, and U. S. 2,688,612 issued to R. W. Watson September 7, 1954.

The water-soluble polyvalent metal salts reacted with the above-described phosphorus sulfide-hydrocarbon reaction products are salts of low molecular weight aliphatic monobasic saturated carboxylic acids of 1 to 4 carbon atoms. Examples of such salts are lead acetate, copper acetate, barium acetate, calcium acetate, zinc acetate, iron acetate, nickel acetate, cobalt formate, lead formate, tin formate, chromium propionate, antimony acetate, copper propionate, tin butyrate, magnesium butyrate, etc.

The mixed salt complexes of the present invention are prepared by adding an aqueous solution of the metal salt of the low molecular weight organic acid to the metal salt of the hydrocarbon-phosphorus sulfide reaction product and reacting the mixture at a temperature of from about 50° F. to about 210° F. for a period sufficient to effect the reaction, normally from about 0.5 to about 3 hours, and then dehydrating the reaction mass at a temperature of from about 250° F. to about 350° F. while blowing with an inert gas, for example, nitrogen, for a period of about 1 to 5 hours. The reaction can be advantageously carried out in the presence of 1% to about 10% water. In the preparation of the complexes the amount of metal salt of the low molecular weight organic acid can vary from 0.1 to 3.0, preferably from 0.1 to 1.0 equivalents of metal for each metal equivalent of the neutralized hydrocarbon-phosphorus sulfide reaction product.

The following examples illustrate the preparation of the mixed salt complexes:

*Example I*

The barium salt of a hydrolyzed clay-contacted reaction product of a polybutene of about 1000 molecular weight and $P_2S_5$, containing 5.3% barium and 2% phosphorus, was heated to 180° F. and an aqueous solution of lead acetate (0.45 equivalent of lead per equivalent of barium) was added and the mixture stirred for 1 hour. The reaction product was then dehydrated by heating to 300° F. while blowing with nitrogen for 2 hours. The resultant product was oil-soluble and contained 4.96% barium, 3.3% lead and 1.85% phosphorus.

*Example II*

The barium-containing reaction product of polybutene and $P_2S_5$ employed in Example I was treated with cobalt acetate (1.0 equivalent cobalt per equivalent of barium) in the manner described in Example I for lead acetate, and the oil-soluble complex recovered.

*Example III*

Example I was repeated using nickel acetate (1.0 equivalent nickel per equivalent barium), and an oil-soluble complex recovered.

*Example IV*

Example I was repeated using copper acetate (1 equivalent copper per equivalent barium), and the oil-soluble complex recovered.

*Example V*

Example I was repeated using lead formate instead of lead acetate, and the oil-soluble complex recovered.

The above-described reaction products can be used in amounts of from about 0.1% to about 10% and preferably from about 0.25% to about 5% in combination with lubricant base oils, such as hydrocarbon oils, synthetic hydrocarbon oils, such as those obtained by the polymerization of hydrocarbons, such as olefin polymers; synthetic lubricating oils of the alkylene-oxide type, for example, the "Ucon oils" marketed by Carbide and Carbon Corporation, as well as other synthetic oils, such as the polycarboxylic acid ester-type oils, such as the esters of adipic acid, sebacic acid, maleic acid, azelaic acid, etc.

To combat corrosion to alloy bearings in internal combustion engines it is the practice to incorporate in the lubricant composition well known corrosion inhibitors. Among the more effective inhibitors are sulfurized terpenes. The sulfurized terpene can be prepared by any of the well known methods, such as by heating mixture of terpene and sulfur to reaction temperatures or by adding the terpene to molten sulfur in accordance with the method fully described in Watson U. S. 2,445,983, issued July 27, 1948. Sulfurized monocyclic, bicyclic or acyclic terpenes as well as polyterpenes can be used. Examples of species falling within these classes of terpenes are pine oil, turpentine, cyamine, alpha-pinene, beta-pinene, allo-ocemene, fenchenes, bornylenes, menthadienes such as limonene, dipentene, terpinene, terpinolenes, etc., sesquiterpenes, diterpene and polyterpenes. Sulfurized mixtures of such terpenes can also be used. Of the sulfurized terpenes the sulfurized dipentene is preferred. Although the sulfurized terpenes are very effective for inhibiting corrosion to bearing alloys such as copper-lead, etc., they are not effective as silver corrosion inhibitors. Since silver and silver alloy bearings are used in certain types of diesel engines, it is desirable to provide in lubricant compositions additives which are effective corrosion inhibitors for the usual alloy bearings as well as silver and silver alloy bearings. The effectiveness of the metal complexes in inhibiting corrosion to silver and silver alloys in the presence of sulfurized terpenes is demonstrated by the following test:

A silver strip 2 cm. x 5.5 cm. with a small hole at one end for suspension is lightly abraded with No. 0 steel wool, wiped free of any adhering steel wool, washed with carbon tetrachloride, air dried and then weighed to 0.1 milligram. 300 cc. of the oil to be tested is placed in a 500 cc. lipless glass beaker and the oil is heated to a temperature of 300° F. (±2° F.) and the silver test strip suspended in the oil so that the strip is completely immersed therein. The oil in the beaker is stirred by means of a glass stirrer operating at 300 R. P. M. At the end of 24 hours, the silver strip is removed and while still hot rinsed thoroughly with carbon tetrachloride and air dried. The silver strip is immersed in a 10% potassium cyanide solution at room temperature until the silver surface assumes its original bright or silver appearance. The silver strip is then washed successively with distilled water and acetone, air dried, weighed and loss in weight noted.

The following lubricant compositions were subjected to the above test:

Sample A.—Solvent-extracted SAE-30 base oil+3.3% barium-containing reaction product of a polybutene (of about 1000 molecular weight) and $P_2S_5$+0.75% sulfurized dipentene.

Sample B.—Solvent-extracted SAE-30 base oil+3.3% product of Example I+0.75% sulfurized dipentene.

Sample C.—Solvent-extracted SAE-30 base oil+3.3% product of Example II+0.75% sulfurized dipentene.

Sample D.—Solvent-extracted SAE-30 base oil+3.3% product of Example III+0.75% sulfurized dipentene.

Sample E.—Solvent-extracted SAE-30 base oil+3.3% product of Example IV+0.75% sulfurized dipentene.

Table I

| Sample | Silver Corrosion (Wt. Loss/Mg.) |
| --- | --- |
| A | 100 |
| B | 1 |
| C | 25 |
| D | 16 |
| E | 20 |

The above data demonstrate the effectiveness of the herein-described metal salt complexes in inhibiting the corrosiveness of sulfurized organic compounds, such as sulfurized dipentene, toward silver and similar metals.

The detergency characteristic and the effectiveness of the herein-described complex salts of the present invention in inhibiting the oxidation of hydrocarbon oils is demonstrated by the data in Table II. These data were obtained by subjecting a hydrocarbon oil with and without the complex salt to the oxidation test known as the Indiana Stirring Oxidation Test (I. S. O. T.). In this test 250 cc. of the oil to be tested are heated at 330–332° F. in a 500 cc. glass beaker in the presence of 5 square millimeters of copper and 10 square millimeters of iron. Four glass rods of 6 millimeters diameter are suspended in the oil which is stirred at about 1300 R. P. M. by means of a glass stirrer. At intervals of 24, 48 and 72 hours oil samples are withdrawn and sludge acidity and varnish values determined. Varnish values or ratings are based upon a visual inspection of the glass rods, in which a rod free of any varnish deposit is given a rating of 10 while a badly coated rod is given a rating of 1. Rods having appearances between these extremes are given intermediate values. The following oil samples were subjected to this test:

Sample A'.—Solvent extracted SAE-30 oil.

Sample B'.—Solvent extracted SAE-30 oil+3.3% barium-containing reaction product of $P_2S_5$ and a polybutene of about 1000 molecular weight+0.5% sulfurized dipentene.

Sample C'.—Solvent extracted SAE-30 oil+3.3% of the Example V complex +0.5 sulfurized dipentene.

Table II

| Sample | Acidity (mg. KOH/g. oil) | | | Naphtha Insoluble [1] | | | Varnish Rating | | |
| --- | --- | --- | --- | --- | --- | --- | --- | --- | --- |
| | 24 hrs. | 48 hrs. | 72 hrs. | 24 hrs. | 48 hrs. | 72 hrs. | 24 hrs. | 48 hrs. | 72 hrs. |
| A' | 3.36 | 6.72 | 9.8 | 0.129 | 5.00 | 6.71 | 9 | 7 | 5 |
| B' | 2.0 | 5.0 | 9.0 | 0.1 | 2.0 | 6.0 | 10 | 10 | 9 |
| C' | 2.24 | 2.8 | 3.34 | None | None | None | 10 | 10 | 10 |

[1] Milligrams per 10 grams oil.

In adidtion to the aforementioned inhibitors, compositions containing the compounds of the present invention can contain other additives, such as anti-oxidants, pour-point depressors, extreme pressure agents, anti-wear agents, V. I. improvers, etc.

While this invention has been described in connection with the use of the herein-described additives and lubricant compositions, their use is not limited thereto; but the same can be used in products other than lubricating oils, such as for example, fuel oils, insulating oils, greases, non-drying animal and vegetable oils, waxes, asphalts, and any fuels for internal combustion engines, particularly where sulfur corrosion must be combatted.

Concentrates of a suitable oil base containing more than 10%, for example up to 50% or more, of the products of this invention alone or in combination with more than 10% of the detergent-type additive and/or other additives, can be used for blending with hydrocarbon oils or other oils in the proportions desired for the particular conditions of use to give a finished product containing from 0.02% to about 10% of the reaction product of this invention.

Percentages given herein and in the appended claims are weight percentages unless otherwise stated.

Although the present invention has been described with reference to specific preferred embodiments thereof, the invention is not to be considered as limited thereto but includes within its scope such modifications and variations as come within the spirit of the appended claims.

We claim:
1. A composition comprising a major proportion of an oleaginous lubricant vehicle and from about 0.1% to about 10% of the oil-soluble salt complex obtained by reacting at a temperature of from about 50° F. to about 210° F. an oil-soluble metal salt of a neutralized phosphorus sulfide-hydrocarbon reaction product with a water-soluble polyvalent metal salt of a low molecular weight aliphatic saturated carboxylic acid of 1 to about 4 carbon atoms, said water-soluble metal salt being used in an amount of from 0.1 to 3.0 equivalents of the polyvalent metal for each metal equivalent of the neutralized phosphorus sulfide-hydrocarbon reaction product and dehydrating the resultant reaction product at a temperature of from about 250° F. to about 350° F. while blowing with an inert gas.

2. A composition as described in claim 1 in which the oil-soluble metal salt of the neutralized phosphorus sulfide-hydrocarbon reaction product is an alkali metal salt.

3. A composition as described in claim 2 in which the alkali-metal salt is the potassium salt.

4. A composition as described in claim 2 in which the alkali-metal salt is the sodium salt.

5. A composition as described in claim 1 in which the oil-soluble metal salt of the neutralized phosphorus sulfide-hydrocarbon reaction product is an alkaline earth salt.

6. A composition as described in claim 5 in which the alkaline earth salt is the barium salt.

7. A composition as described in claim 5 in which the alkaline earth salt is the calcium salt.

8. A composition as described in claim 1 in which the oil-soluble metal salt of the neutralized phosphorus sulfide-hydrocarbon reaction product is a heavy metal salt.

9. A composition as described in claim 1 in which the water-soluble metal salt of the low molecular weight aliphatic saturated carboxylic acid is an alkaline earth salt.

10. A composition as described in claim 1 in which the water-soluble metal salt of the low molecular weight aliphatic saturated carboxylic acid is a heavy metal acetate.

11. A composition as described in claim 10 in which the heavy metal acetate is lead acetate.

12. A composition as described in claim 10 in which the heavy metal acetate is cobalt acetate.

13. A composition as described in claim 10 in which the heavy metal acetate is copper acetate.

14. A composition as described in claim 1 in which the water-soluble metal salt is lead formate.

15. A lubricant composition comprising a major proportion of a viscous hydrocarbon oil and from about 0.1% to about 10% of the oil-soluble mixed salt complex obtained by reacting at a temperature of from about 50° F. to about 210° F. an oil-soluble barium salt of a neutralized phosphorus sulfide-hydrocarbon reaction product with a water-soluble heavy metal acetate, said acetate being used in an amount of from 0.1 to 3.0 equivalents of the heavy metal for each barium equivalent of the neutralized phosphorus sulfide-hydrocarbon reaction product and dehydrating the resultant reaction product at a temperature of from about 250° F. to about 350° F. while blowing with an inert gas.

16. An addition agent for lubricating oils comprising an oleaginous lubricating oil vehicle containing more than 10% of the oil-soluble salt complex obtained by reacting at a temperature of from about 50° F. to about 210° F. an oil-soluble metal salt of a neutralized phosphorus sulfide-hydrocarbon reaction product with a water-soluble polyvalent metal salt of a low molecular weight aliphatic saturated carboxylic acid of 1 to about 4 carbon atoms, said water-soluble metal salt being used in an amount of from 0.1 to 3.0 equivalents of the polyvalent metal for each metal equivalent of the neutralized phosphorus sulfide-hydrocarbon reaction product and dehydrating said reaction product at a temperature of from about 250° F. to about 350° F. while blowing with an inert gas, said concentrate being capable of dilution with an oleaginous lubricating oil vehicle to form a homogeneous mixture containing from about 0.1% to about 10% of said oil-soluble salt complex.

References Cited in the file of this patent

UNITED STATES PATENTS

| | | |
|---|---|---|
| 2,367,470 | Neeley et al. | Jan. 16, 1945 |
| 2,422,585 | Rogers et al. | June 17, 1947 |
| 2,677,659 | Reiff | May 4, 1954 |